United States Patent [19]

Bommer

[11] Patent Number: 4,848,277

[45] Date of Patent: Jul. 18, 1989

[54] CALORIFIC VALUE BOILER

[76] Inventor: Rolf Bommer, Reichlin-Von-Meldegg-Strasse 4, 7770 Überlingen, Fed. Rep. of Germany

[21] Appl. No.: 192,327

[22] Filed: Apr. 22, 1988

[30] Foreign Application Priority Data

Apr. 29, 1987 [DE] Fed. Rep. of Germany ....... 3714261

[51] Int. Cl.$^4$ ............................................. F22B 33/00
[52] U.S. Cl. ................................. 122/20 B; 126/365; 237/19
[58] Field of Search ........................... 122/20 A, 20 B; 126/365; 237/19, 8 R

[56] References Cited

U.S. PATENT DOCUMENTS

| | | | |
|---|---|---|---|
| 4,211,187 | 7/1980 | Farris | 122/20 B |
| 4,417,546 | 11/1983 | Huskinson | 122/20 B |
| 4,429,830 | 2/1984 | Förster et al. | 237/19 |
| 4,512,288 | 4/1985 | Michaud | 122/20 B |

*Primary Examiner*—Edward G. Favors
*Attorney, Agent, or Firm*—Eugene E. Renz, Jr.

[57] ABSTRACT

A calorific value boiler device for supplying heat to at least one user of heat contained in a heat medium via a first supply line and at least one return line. The device includes a boiler having a blower equipped burner with flue gases discharged in a specific direction and at least two heat exchangers arranged in series to receive the flue gases sequentially in that direction. Also provided is a stratified thermal storage unit for delivering medium to the user via a first supply line. A first line is for transferring heat medium from the first heat exchanger in the series to the top layer of the storage unit. A second line is for transferring heat medium from the bottom layer of the storage unit to the last heat exchanger in the series. A third line is for transferring heat medium from the middle of the storage unit to the first heat exchanger and having a flow cross section at least twice that of the second line. A common pump is employed for transferring the heat medium through all of the heat exchangers, and the return lines return the heat medium to the mid level of the storage unit.

16 Claims, 5 Drawing Sheets

CALORIFIC VALUE BOILER

FIELD OF THE INVENTION

The present invention relates to a calorific value boiler in which at least two (2) heat carrier streams are acted upon successively by the flue gases of a blower-equipped burner.

BACKGROUND OF THE INVENTION

Heating boilers in which the flue gases are cooled to condensation, which results in especially good energy utilization, are called calorific value boilers. Effective condensation occurs in these heating boilers only if the return temperature of the heat carrier medium flowing back to the heating boiler is low, i.e., preferably between 30° C. and 40° C. This return temperature is not reached in prior-art heating boilers, which means that they cannot operate with optimum calorific value. Furthermore, these heating boilers are adjusted to the actual thermal output needed by the heat consumers by shutting the burner on and off. This frequent starting, which is associated with poor combustion characteristics, causes not only a considerable increase in energy consumption, but also considerable environmental pollution.

West German Pat. No. 3,325,200 describes a heating boiler in which two or more heat exchangers are arranged in series in the direction of flow of the flue gases, the flue gases of a blower-equipped burner acting on the exchangers consecutively. The heat carrier streams of these heat exchangers are sent a domestic water stratified thermal storage unit via heating registers. The heating register associated with the first heat exchanger acted on first by the flue gases is in the topmost, hottest layer of the stratified thermal storage unit so that most of the heat is transferred to the stratified thermal storage unit. The heating register associated with the last heat exchanger acted on last by the flue gases is located in the lowermost, coldest layer of the stratified thermal storage unit, so that the heat carrier stream forming through the last heat exchanger has a low temperature that is sufficient for the condensation of the flue gases. In addition, the stratified thermal storage unit also serves as a buffer storage unit, by which the frequency of burner starts is greatly reduced. The burner must now be started only after the stored hot water reserve has been used up, and it can then operate without interruption until the stratified thermal storage unit has been heated all the way down to the lowermost layers.

In this prior-art heating boiler, the stratified thermal storage unit serves to heat the household water, whereas the heating system is fed directly by the boiler. To avoid the frequent starting and stopping of the burner to adjust to the heating plant system requirements, the heat carrier streams of the heat exchangers are switched between the heating system and the domestic water stratified thermal storage unit. Once the domestic water storage unit has been heated up completely, the burner will again have to be turned on and off frequently to adjust to the heat requirement of the heating system.

The prior-art boiler operates with good useful output, since cold fresh water is fed into the domestic water stratified thermal storage unit to make up for the warm domestic water removed, so that the lowermost layer usually contains cold fresh water.

In the prior-art boiler, the heat exchangers and the heating registers in the domestic water stratified thermal storage unit always form separate loops, each of which need a separate pump, which makes installation expensive.

SUMMARY OF THE INVENTION

The present invention is admirably suited for remedying the prior art deficiencies by providing a calorific value boiler which offers improved thermal output characteristics at low installation cost. Also provided is a process for operating such a boiler to improve operating expenses.

Specifically, the present invention comprises a calorific value boiler device for supplying heat to at least one user which is contained in a heat medium. The heat is supplied to the user or users by a first supply line and returns from the user or users in at least one or more return lines. The boiler device includes a boiler which has a blower equipped burner which discharges flue gases in a specific direction. Placed in the specific direction are at least two heat exchangers which are arranged in series to receive the flue gases sequentially in that direction, so that the first heat exchanger receives the flue gases closest to the boiler and the last heat exchanger receives the flue gases furthest from the boiler. The heat medium is stored in a stratified thermal storage unit for delivering the heat medium to the user via the first supply line. There is a first line means for transferring heat medium from the first heat exchanger in the series to the top layer of the storage unit. A second line means is provided for transferring heat medium from the bottom layer of the storage unit to the last heat exchanger in the series. A third line means is provided for transferring heat medium from the middle of the storage unit to the first heat exchanger. This third line means has a flow cross section which is at least twice that of the flow cross section of the second line means. A common pump means is used for transferring the heat medium through all of the heat exchangers in the series. Finally, the one or more return lines are positioned to return the heat medium to the mid level of the storage unit.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

According to the present invention, the calorific value boiler, comprising at least two heat exchangers into which the flue gases are admitted consecutively, is associated with a stratified thermal storage unit, which serves as a buffer storage unit for the heating system. The heat carrier stream of the first heat exchanger acted on first by the flue gases flows through the top part of the stratified storage unit. The heating system is supplied exclusively from this top part of the stratified storage unit. The line of the heating system opens into a middle layer of the stratified storage unit, so that the heating water circulates only through this upper part of the stratified storage unit. In contrast, a low-temperature layer is stored at the bottom of the stratified storage unit. This cold button layer is not influenced even by a high return temperature (60°-80° C.) of the heating system. A high heating system return temperature raises the temperature only of the heat carrier stream sent to the first heat exchanger of the boiler. Since the hot flue gases from the burner are admitted act directly on this first heat exchanger, there is always a large temperature differential at this first heat exchanger.

The glue gases acting on the last heat exchanger of the boiler have already been cooled to ca. 60–80° C. by the preceding heat exchanger. To cool these flue gases to a temperature of ca. 30–40° C., which is needed for complete condensation, the heat carrier stream from the cold, lowermost layer of the stratified storage unit is sent to this least heat exchanger. Since only a small amount of heat can now be extracted from the flue gases, a low throughput is sufficient from the last heat exchanger. Thus, only a small amount of the cold water must be removed from the lowermost layer of the stratified storage unit. This small amount is replenished by the cold return from the heating system during the morning heat-up period, possibly by the return from partial heating at a lower temperature or by the return from a domestic water heater. Since the last heat exchanger of the boiler needs only a small throughput, these amounts of low-temperature return are sufficient to provide for a sufficient low-temperature layer at the bottom of the stratified thermal storage-unit at all times.

The heat carrier streams of all heat exchangers of the boiler are returned together to the top layer of the stratified storage unit by a single pump to heat this layer. To ensure the large throughput needed through the first heat exchanger, which is located near the burner, and only a small throughput through the last heat exchanger, despite the fact that only this shared pump is used, simplest solution is to dimension the pipeline cross sections according to the desired throughputs. It is also possible, however, to provide a means for controlling the throughput, preferably in the feed pipe to the last heat exchanger. The possibility of controlling the throughput offers the additional advantage that the throughput of the last heat exchanger can be adjusted to the actual residual heat of the flue gases. If the heating system has a high return temperature of 80° C., for example, the flue gases reach the last heat exchanger at least at this temperature, so that a larger amount of residual heat must be extracted from them, i.e., the throughput of the last heat exchanger must be increased. If the heating plant has a low return temperature of 60° C., for example, a smaller amount of heat must be extracted from the flue gases by the last heat exchanger, so that the throughput of this heat exchanger can be reduced. The amount removed from the cold lowermost layer of the stratified storage unit can thus be minimized to achieve the longest possible period of complete condensation on the last heat exchanger at a predetermined amount of low-temperature water.

The heating boiler equipped with the stratified thermal storage unit can form an open system together with the loop of the heating system. It is also possible to isolate the heat carrier stream of the heat exchangers from the loop of the heating system by circulating the heat carrier stream in a heating register through the stratified storage unit.

The stratified storage unit also reduces the number of burner starts. The burner must now be started only after the top hot layer of the stratified storage unit has been depleted by the heat consumer. The burner will stay on until the top layer has again been heated up completely.

The stratified storage unit can also consist of two separate tanks, one for the warm layers and one for the lower cold layer. This is usually, unnecessary, however, and involves a more expensive design.

The heat exchangers of the boiler can be connected directly to one another. It is also possible to install the heat exchangers separate from each other in space, in which case especially the last heat exchanger, i.e., that which serves for condensation, can be installed as a separate unit, e.g., to ensure more favorable discharge of the condensed water.

Of course, the calorific valve boiler according to the present invention can be used not only to operate a heating system, but also to operate a domestic water heater. To achieve this, some of the heat carrier stream heated in the heat exchangers can advantageously be shunted to a water heater by means of a valve or pump.

The buffer effect achieved by means of the stratified storage unit makes it possible to operate the boiler with a minimum amount of heat carrier, so that it operates nearly according to the principle of an instantaneous water heater. The heating boiler itself thus has a very low thermal capacity and thermal inertia. Therefore, the burner is started, it very rapidly reaches the optimum operating temperature, which both improves efficiency and reduces the amount of pollutants generated.

In addition, the boiler can be built in this matter to obtain a very compact and light-weight unit, which makes it possible to mount the boiler directly on the stratified unit, so that the stratified storage unit and the heating boiler form a compact unit which requires little space and has a pleasing appearance.

The present invention is explained below in greater detail on the basis of the examples shown in the drawing.

Figure 1:
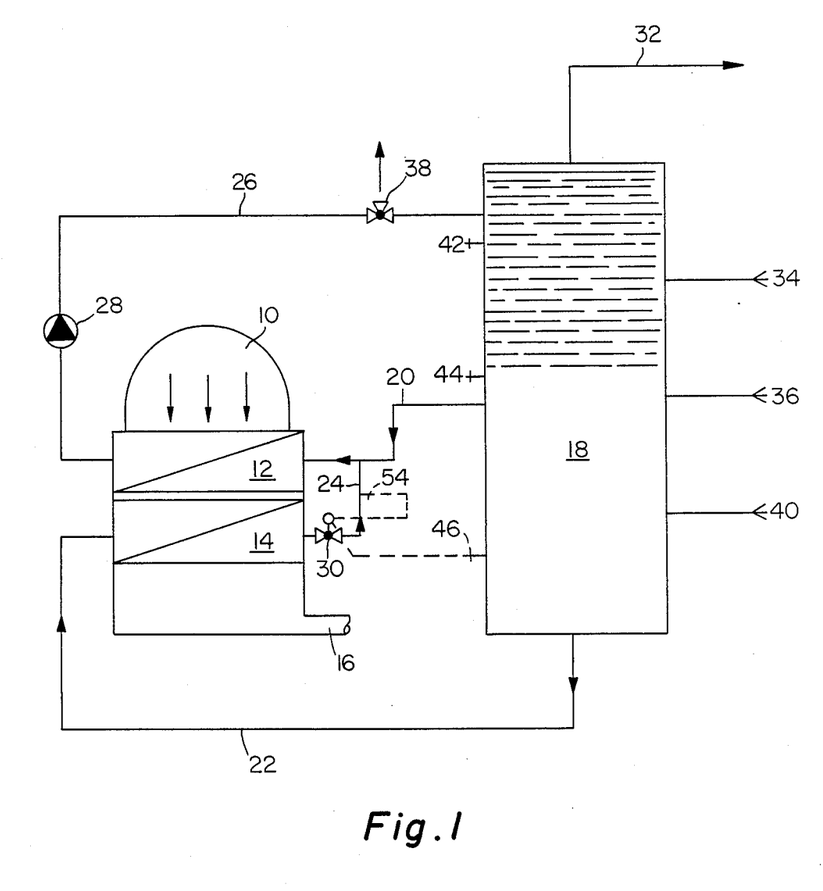
FIG. 1 and FIG. 1a shows a heating boiler according to the present invention with a loop that is opened with respect to the heating system.

As shown in FIG. 1, the heating boiler has a top-mounted combustion chamber 10, which is part of a blower-equipped gas or oil burner. The hot flue gases from the burner flow in a downward direction, as indicated by the arrows in the drawing, passing through two heat exchangers 12,14 in succession. At the bottom, the flue gases leave the boiler through a flue gas pipe 16.

The boiler is associated with a stratified thermal storage unit 18 with a volume of 200–800 liters. Water which is the preferred heat medium, is removed from stratified storage unit 18 via a line 20 at mid-level and sent first to heat exchanger 12 acted on first by the flue gases. Water is removed from the bottom of storage unit 18 via a line 22 and sent to heat exchanger 14 acted on last by the flue gases. The water being discharged from heat exchanger 14 is sent to the inlet side of first heat exchanger 12 via a line 24. The discharge side of first heat exchanger 12 is connected to the top layer of storage unit 18 by a line 26, in which a pump 28 is installed.

Pump 28 draws water from a middle layer of stratified thermal storage unit 18 via line 20 and first heat exchanger 12 and also from the lowermost layer of storage unit 18 via line 22, last heat exchanger 14, and first heat exchanger 12. It is a great advantage to use one pump for all heat medium transfers. The ratio of the amounts is determined by the ratio of the cross sections of lines 20 and 22. This ratio of the cross sections is selected so that the throughput through line 20 and thus through first heat exchanger 12 is at least twice that of line 22 and, in a preferred embodiment is approximately 10 times the throughput through line 22 and thus through the last heat exchanger 14.

An adjustable control valve 30, which provide additional control of the throughput through last heat exchanger 14, in addition to the control provided by the cross section ratio, is preferably installed in line 24. As indicated by the broken line in the drawing, control valve 30 is controlled by a temperature sensor 54 on line 24 and a temperature sensor 46 in the lowermost zone of the stratified thermal storage unit 18. Temperature sensor 46 measures the temperature of the water entering heat exchanger 14 from storage unit 18 via line 22, while temperature sensor 54 measures the temperature of the water leaving heat exchanger 14. When the temperature difference between temperature sensors 54 and 46 arise, this means that a large residual amount of heat is still to be removed from the flue gases, and control valve 30 increases the throughput through last heat exchanger 14.

A radiator type heating system is supplied through a feed line 32 coming from stratified thermal storage unit 18. Return 34 of the radiator type heating system opens into the upper third of storage unit 18. Furthermore, a low-temperature heating system, e.g., a floor heating system, can be supplied by storage unit 18; return 36 opens into storage unit 18 at approximately mid-level.

Finally, the feed for a water heater can be branched off by a valve 38 mounted in line 26; return 40 from the water heater opens into stratified thermal storage unit 18 approximately one third of the way up from the bottom.

Stratified thermal storage unit 18 also has three temperature sensors 42, 44, 46. Temperature sensor 42 is located in the upper zone of storage unit 18, slightly below the height at which line 26 enters. Temperature sensor 44 is located at mid-level storage unit 18, slightly above the height at which line 20 exits. Temperature sensor 46 is located in the lower zone of storage unit 18, approximately one fifth of the way up from the bottom of the storage unit and below return 40 from the water heater.

The burner continues to operate until the hot water supplied through line 26 has reached middle temperature sensor 44 in the downward direction, as indicated by broken lines in the drawing. The burner flame can now be adjusted, if desired, to the amount of heat required, depending on the load. The stratified thermal storage unit is then loaded, and the burner and pump 28 are turned off.

When hot heating water is removed from stratified thermal storage unit 18 through supply line 32, cooled return water is returned via return lines 34, 36. This water sinks down through the hot top layer of stratified storage unit 18 and collects at the lower boundary of this hot layer.

The lower boundary of the stratified thermal storage unit thus migrates upward. When this interface reaches upper temperature sensor 42, the burner and pump 28 are started again, and storage unit 18 is loaded again.

A layer of lower temperature, which is determined essentially by the return temperature of the heating system, is formed below middle temperature sensor 44. The water fed into first heat exchanger 12 through line 20 has the temperature of this middle layer, so that the flue gases are cooled in first heat exchanger 12 essentially to the return temperature of the heating system.

When the temperature is in returns 34, 36 assumes low values below ca. 30° C., as happens, e.g., during the morning start-up of the heating system, this cooled return water sinks down through stratified thermal storage unit 18. The cold water of return 40 from the water heater also sinks down in storage unit 18. Thus, a layer of cold water with a temperature of ca. 30° C. collects at the bottom of the storage unit. This cold layer has a volume of about 100-150 liters. The cold layer is reduced only by the relatively small amount of water removed through line 22. Even if no sufficiently cold return water is available for replenishment, therefore, the cold layer is still large enough to cool the flue gases to a temperature low enough for condensation in last heat exchanger 14 during a burner operating time of about 10-15 hours.

If the water supplied to first heat exchanger 12 via through line 20 has a relatively low temperature of ca. 60° C., the water temperature difference between lines 20 and 22 will decrease, and control valve 30 will reduce the cold water throughput through last heat exchanger 14. Due to the more intense cooling of the flue gases in first heat exchanger 12, only a small amount of residual heat can be extracted from the flue gases in last heat exchanger 14.

In the embodiment according to FIG. 1, the heat exchanger loop is open with respect to the heating loop. The same water flows through heat exchangers 12,14, the heating loops, and the water heater loop.

Figure 1A:
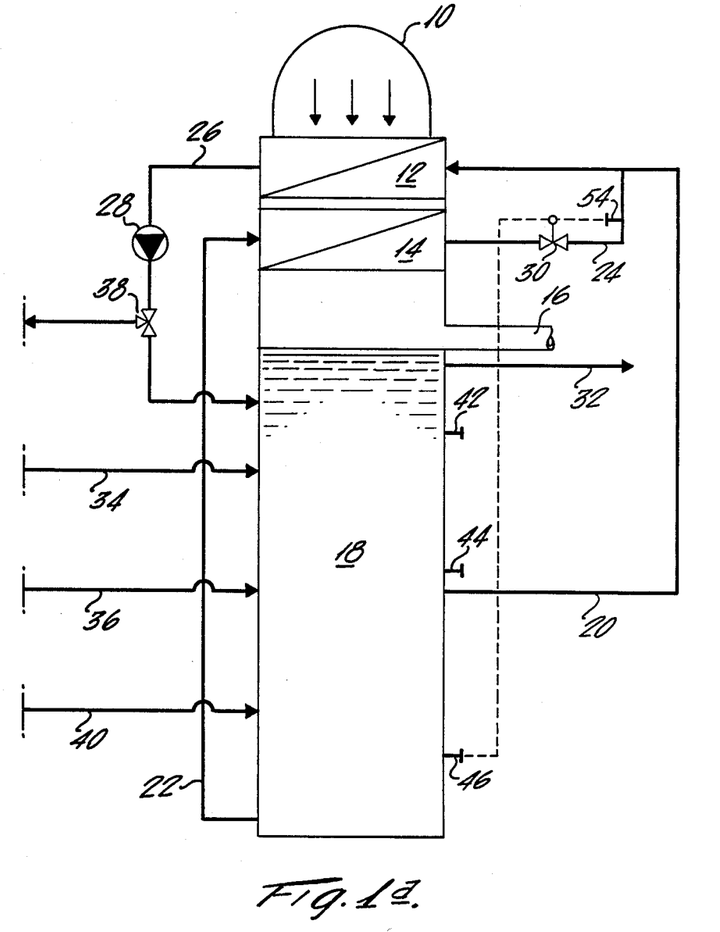

FIG. 1a shows the same elements of FIG. 1, with the boiler and storage unit mounted together to form a compact unit.

Figure 2:
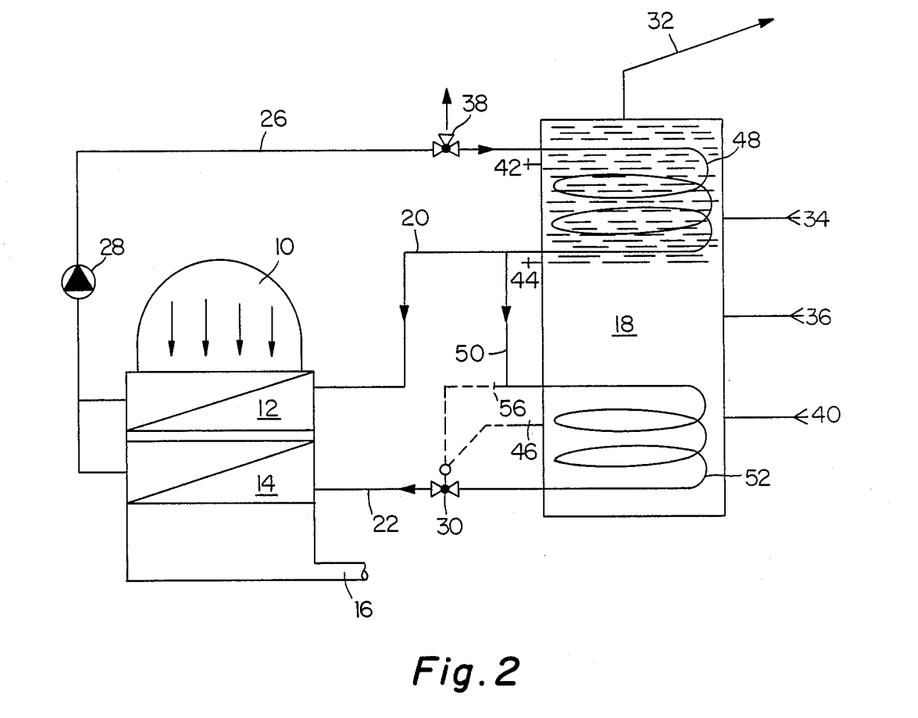
FIG. 2 shows a heating boiler according to the present invention with a loop that is closed with respect to the heating system.

FIG. 2 shows a modified embodiment in which the heat exchanger loops are closed with respect to the heating loop. The water flowing through first heat exchanger 12 is sent through line 26 through a heating register 48, which is arranged in the hot top layer of stratified thermal storage unit 18, and it returns to first heat exchanger 12 from heating register 48 via line 20. A line 50, which leads to a heating register 52 in the lowermost cold layer of storage unit 18 branches off from line 20; the water is fed from the heating register 52 into last heat exchanger 14 via line 22.

The ratio of the amount of water flowing through upper heating register 48 and first heat exchanger 12 to the amount of water flowing through lower heating register 52 and last heat exchanger 14 is determined by the ratio of the cross sections of lines 20,22 in this case as well. Preferably line 20 will have a flow cross section at least twice that of line 22. In a preferred embodiment, the throughput will be approximately 10 times larger. The throughput through last heat exchanger 14 can again be modified by a control valve 30. Control valve 30 is controlled by a temperature sensor 56 on line 50 and by temperature sensor 46 in the lower cold layer of storage unit 18. Temperature sensor 56 measures the temperature of the water being sent to first heat exchanger 12 and thus the minimum temperature of the flue gases being discharged from first heat exchanger 12 and acting on last heat exchanger 14. If the temperature between temperature sensors 56 and 46 rises, this means that a larger amount of residual heat must be extracted from the glue gases in last heat exchanger 14 to achieve condensation. Therefore, control valve 30 increases the throughput through last heat exchanger 14.

In the embodiment according to FIG. 2, the water is sent directly to pump 28 after it has passed through last heat exchanger 14 without being sent beforehand through first heat exchanger 12 again. Due to the ratio of the throughput through first heat exchanger 12 to the throughput through last heat exchanger 14, this does not imply any sustantial reduction in the temperature of the water sent to stratified thermal storage unit 18 via line 26.

The closed heat exchanger loop according to FIG. 2 has the advantage that no scaling problems occur in the heat exchanger loops; it also is possible, if desired, to use a heat carrier medium other than water.

Figure 3:
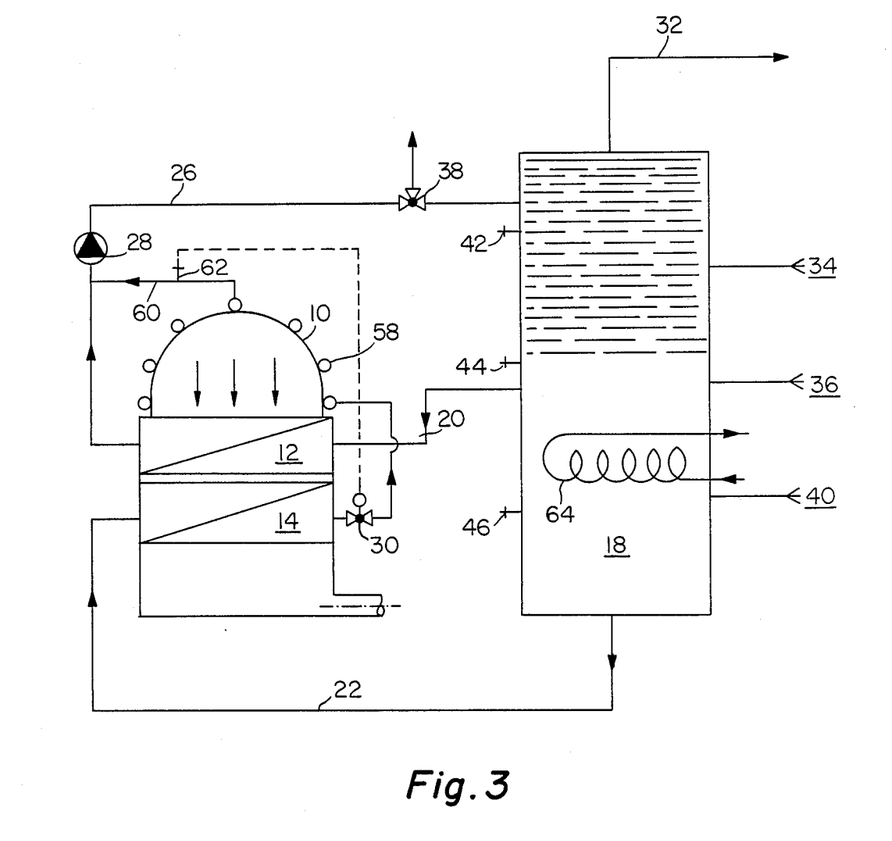
FIG. 3 shows a heating boiler according to the present invention in a modified version of the embodiment shown in FIG. 1.

FIG. 3 shows a modified version of the embodiment according to FIG. 1. Insofar as this embodiment is identical to the embodiment according to FIG. 1, we refer to the above description.

In the embodiment according to FIG. 3, the water leaving last heat exchanger 14 is not sent to first heat exchanger 12 but rather through tube coils 58 to cool the wall of combustion chamber 10 of the boiler, these coils being arranged on the outside wall of combustion chamber 10 in heat-conducting contact. The water being heated while flowing through tube coils 58 is sent to line 26 via line 60.

Only a small amount of heat is extracted from the flue gases for condensation in last heat exchanger 14. The small amount of cold water flowing from the lowermost layer of stratified thermal storage unit 18 through last heat exchanger 14 is therefore heated only moderately in heat exchanger 14. The small amount of moderately preheated water is able gently to cool the wall of combustion chamber 10 via tube coils 58 so that the wall temperature does not exceed about 600° C. at full burner load, and it does not drop below about 180° C. at reduced burner load. The temperature of the combustion gases in combustion chamber 10 is therefore kept below about 600° C., so that the amount of $NO_X$ formed does not give rise to environmental pollution. On the other hand, the burner output can be reduced to adjust it to the amount of heat needed, e.g., during the transition seasons or in the summer when only hot domestic water is needed, without the supercooling of the burner flame which occurs at the wall of the combustion chamber.

Control valve 30 controls the throughput through last heat exchanger 14 according to the temperature of the water being supplied from the lowermost layer of stratified thermal storage unit 18 to heat exchanger 14 via line 22 to ensure the condensation of the flue gases in last heat exchanger 14, and, on the other hand, according to the temperature of the water leaving tube coils 58 through line 60, which is measured by a sensor 62. If the temperature of the water in the line 60 increases too much, the throughput must be increased to prevent the temperature at the inner wall of combustion chamber 10 from exceeding a value of about 600° C., at which intensified $NO_X$ formation begins. If the temperature in line 60 drops too far, the throughput will be reduced to prevent excessive cooling of the wall of combustion chamber 10 and consequently the supercooling of burner flame which may lead to incomplete combustion, which is associated with low efficiency and high concentration of toxic substances, as well as to condensation on the combustion chamber wall.

Finally, the embodiment according to FIG. 3 shows that, as another possibility, an additional heating register 64, through which cold domestic water can be circulated for preheating, can be provided in the lower zone of stratified thermal storage unit 18. This guarantees that a sufficient amount of cold water will always be present in the lowermost layer of storage unit 18 even during a prolonger burner run to extract the residual heat from the combustion gases in last heat exchanger 14 for condensation.

Figure 4:
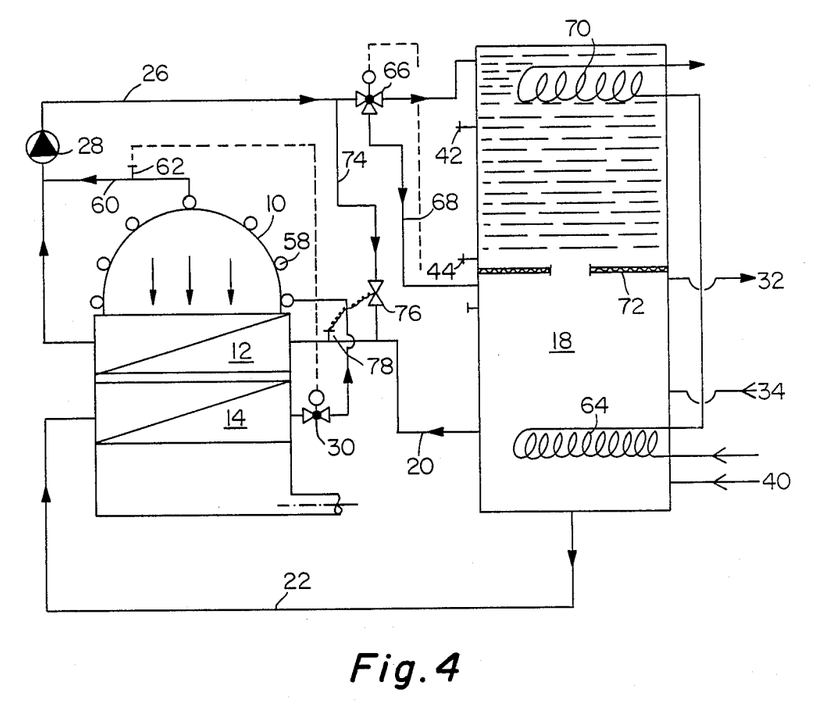
FIG. 4 shows a heating boiler according to the present invention in another modified version of the embodiment shown in FIG. 3.

Another modified version of the embodiment according to FIG. 3 is shown in FIG. 4. Insofar as this embodiment is identical to the embodiment according to FIG. 3, we refer to the description given in connection with FIG. 3.

The upper zone of stratified thermal storage unit 18 is loaded to a constant temperature of up to, e.g., 80° C. via line 26. To achieve this, temperature sensors 42,44 control a valve 66 installed in line 26. Once the top layer has been loaded to the higher temperature to the level of temperature sensor 44, valve 66 is switched, and it now connects line 26 to the lower zone of storage unit 18 via line 68.

The lower zone of storage unit 18 is operated at a lower temperature of about 30°-75° C., which is controlled by an outside temperature sensor. Feed line 32 to the heating system exits from the topmost layer of the lower zone of stratified thermal storage unit 18. Return lines 34,40 open into the lower layers of the lower zone. The high-temperature upper zone of storage unit 18 serves heat consumers of higher temperature levels, e.g., especially for domestic water heating. To achieve this, the cold domestic water is first pre-heated in the lower zone of storage unit 18 via heating register 64 and then passed through another heating register 70 in the upper zone and heated to the temperature of the upper zone, e.g., to 80° C.

If desired, an insulating partition 72 with an opening in it can be provided between the upper zone and the lower zone of storage unit 18. So that excessively cold water is not supplied to upper heat exchanger 12 via line 20, some of the heated water flowing in line 26 can be mixed with the water fed into line 20 via a branch line 74. A throttle valve 76 arranged in line 74 controls this mixed-in component flow according to the temperature at the inlet of heat exchanger 12, which is measured by a temperature sensor 78.

It is evident from the above description that the present invention is not limited to the use of two heat exchangers in the boiler. If desired, it is also possible to provide another heat exchanger between first heat exchanger 12 and last heat exchanger 14, this additional heat exchanger being supplied from a middle level of the storage unit. Such an additional heat exchanger implies a more expensive design, but the flue gases are cooled more intensely, so that the residual heat to be extracted by the last heat exchanger is smaller and condensation takes place reliably with a smaller amount of water in the lowermost cold layer of stratified thermal storage unit 18.

A small calorific value boiler is combined with a stratified thermal storage unit (18) acting as a buffer storage unit for supplying a heating system. The boiler has a least two heat exchangers (12,14), on which the flue gases act in succession. The first heat exchanger (12), on which the flue gases act first, heats an upper hot layer of the stratified thermal storage unit 18. The last heat exchanger (14) is supplied with the cold water from the lowermost layer of the stratified storage unit to condense the flue gases. The return lines (34,36,40) open into the middle level of the stratified storage unit (18), so that a stable cold layer, from which only a small amount of water is removed for the last heat exchanger (14), is stored in the unit's lower part.

What is claimed is:

1. A calorific value boiler device for supplying heat to at least one user of heat contained in a heat medium via a first supply line and at least one or more return line, comprising:
    a boiler having a blower equipped burner with flue gases discharged in a specific direction;
    at least two heat exchangers arranged in series to received said flue gases sequentially in said direction;
    a stratified thermal storage unit for delivering medium to said user via said first supply line; and having a top, mid and bottom layer;
    first line means (26) for transferring heat medium from the first heat exchanger in said series to the top layer of said storage unit;
    second line means (22) for transferring heat medium from the bottom layer of said storage unit to the last heat exchanger in said series;
    third line means (20) for transferring heat medium from the mid layer of said storage unit to said first heat exchanger and having a flow cross section at least twice that of said second line means;
    common pump means for transferring said heat medium through all of said heat exchangers; and
    said return lines being positioned to return said heat medium to the mid level of said storage unit.

2. The device of claim 1 which further includes valve means for controlling the flow of heat medium in said second line means.

3. The device of claim 2 wherein said valve is a temperature control valve (30).

4. The device of claim 1 wherein the last heat exchanger includes a discharge side connected to the inlet side of the first heat exchanger.

5. The device of claim 1 wherein the discharge sides of said heat exchangers are all connected in parallel to said first line means.

6. The device of claim 1 wherein the discharge side of said last heat exchanger is connected to a tube coil positioned adjacent said blower equipped burner to cool the combustion chamber of said burner.

7. The device of claim 1 wherein said pump means is installed in said first line means.

8. The device of claim 1 wherein said first, second and third line means are in open system communication with said stratified thermal storage unit.

9. The device of claim 1 which further includes a first heat exchange loop positioned inside the top layer of said storage unit for transferring said medium from said first means through heat exchanging contact with the interior of said top of said storage unit to said third line means.

10. The device of claim 9 which further includes a second heat exchange loop positioned in the bottom layer of said stratified thermal storage unit to receive a portion of the heat medium from said third line means to bring said medium in heat exchange relationship with said bottom layer of said storage unit to said second line means.

11. The device of claim 1 which further includes diversion valve means for diverting a portion of the heat medium in said first line means to a water heater.

12. The device of claim 1 which further includes switching valve means for switching the transfer of heat medium in said first means from entry into said storage unit at said top layer to entry of said storage unit below said top layer.

13. The device of claim 1 wherein said boiler and said storage unit are mounted together to form a compact unit.

14. A process for operating a calorific value boiler comprising at least two heat carrier streams acted upon successively by the flue gases of a blower-equipped burner, said heat carrier streams heating a stratified thermal storage unit which supplies one or more heat consumers, where the first heat carrier stream acted on first by the flue gases is sent to the top layer of the stratified thermal storage unit and is removed from a middle layer of the stratified thermal storage unit, while the last heat carrier stream acted on last by flue gases is removed from the lowermost layer of the stratified thermal storage unit, characterized in that the heat carrier streams are sent together to the top layer of the stratified thermal storage unit; in that the throughput of the first heat carrier stream is several times the throughput of the last heat carrier stream; and in that the returns from the heat consumers are conducted into the stratified thermal storage unit above the lowermost layer.

15. Process according to claim 14, characterized in that the throughput of at least the last heat carrier stream is controllable.

16. Process according to claim 15, characterized in that the throughput of the last heat carrier stream is controlled as a function of the degree to which it is heated by the flue gases acting on it and is increased as the degree of heating increases.

* * * * *